(12) United States Patent
Tiwari et al.

(10) Patent No.: US 11,119,878 B2
(45) Date of Patent: *Sep. 14, 2021

(54) SYSTEM TO MANAGE ECONOMICS AND OPERATIONAL DYNAMICS OF IT SYSTEMS AND INFRASTRUCTURE IN A MULTI-VENDOR SERVICE ENVIRONMENT

(71) Applicant: INTERNATIONAL BUSINESS MACHINES CORPORATION, Armonk, NY (US)

(72) Inventors: Awadesh Tiwari, Bangalore (IN); Ramshanker Kowta, Bangalore (IN); Jayachandran Kizhakoot Ramachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,191

(22) Filed: Jan. 10, 2020

(65) Prior Publication Data
US 2020/0151079 A1 May 14, 2020

Related U.S. Application Data

(63) Continuation of application No. 15/820,696, filed on Nov. 22, 2017, now Pat. No. 10,585,773.

(51) Int. Cl.
*G06F 11/00* (2006.01)
*G06F 11/32* (2006.01)
(Continued)

(52) U.S. Cl.
CPC .......... *G06F 11/328* (2013.01); *G06F 11/008* (2013.01); *G06F 11/3006* (2013.01);
(Continued)

(58) Field of Classification Search
CPC ...................................................... G06F 11/008
See application file for complete search history.

(56) References Cited

U.S. PATENT DOCUMENTS 7,328,128 B2    2/2008 Bonanni
7,543,192 B2    6/2009 Vaidyanathan
(Continued)

OTHER PUBLICATIONS

Changhua, Hu et al.; A survey on life prediction of equipment; Chinese Society of Aeronautics and Astronautics & Beihang University Chinese Journal of Aeronautics, vol. 28, Issue 1; Feb. 2015; pp. 25-31.

(Continued)

*Primary Examiner* — Joseph R Kudirka
(74) *Attorney, Agent, or Firm* — Schmeiser, Olsen & Watts; Nicholas L. Cadmus

(57) ABSTRACT

A method is provided to manage economics and operational dynamics of various information technology (IT) systems. A computer collects data indicative of operation of a plurality of hardware components and collects data indicative of operation of a plurality of software components. The computer creates a first qualitative value representing a hardware status of the plurality of the hardware components and a second qualitative value representing a software status of the plurality of the software components. The first and second qualitative values are displayed in graphical form for evaluation by a system operator, and the computer computes a probability of life expectancy for the plurality of hardware components and the plurality of software components based on said first and second qualitative values and utilizing cognitive and artificial intelligence based calculations to determine the probability.

20 Claims, 14 Drawing Sheets

(51) Int. Cl.
*G06F 11/34* (2006.01)
*G06F 11/30* (2006.01)
*G06N 5/00* (2006.01)

(52) U.S. Cl.
CPC ...... *G06F 11/3442* (2013.01); *G06F 11/3452* (2013.01); *G06F 11/3466* (2013.01); *G06N 5/00* (2013.01)

(56) References Cited

U.S. PATENT DOCUMENTS

| | | |
|---|---|---|
| 7,672,921 B1 | 3/2010 | Clay |
| 8,145,536 B1 | 3/2012 | Goel |
| 8,620,779 B2 | 12/2013 | Keyes, IV |
| 9,282,008 B2 | 3/2016 | Shah |
| 10,157,105 B2 | 12/2018 | Chen |
| 2007/0282645 A1 | 12/2007 | Brown |
| 2015/0193325 A1 | 7/2015 | Harsan-Farr |
| 2019/0155712 A1 | 5/2019 | Tiwari |

OTHER PUBLICATIONS

DuJack, Jared L.; List of IBM Patents or Patent Applications Treated as Related; Jan. 10, 2020; 1 page.

OVERALL SYSTEM ODOMETER

HARDWARE ODOMETER    SOFTWARE ODOMETER

HARDWARE $X_1$   HARDWARE $X_2$   HARDWARE $X_3$   HARDWARE $X_4$   HARDWARE $X_n$

SOFTWARE $Y_1$   SOFTWARE $Y_2$   SOFTWARE $Y_3$   SOFTWARE $Y_4$   SOFTWARE $Y_n$

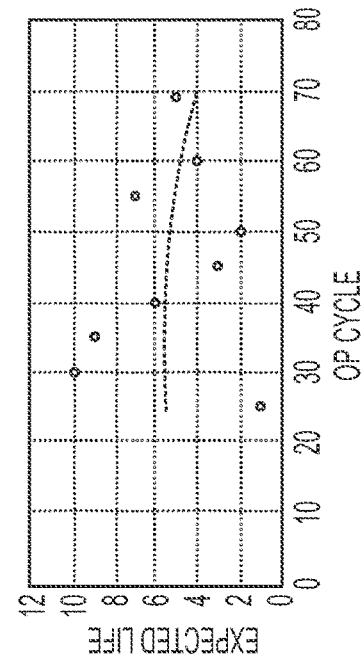
FIG. 8A
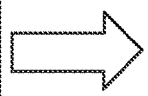
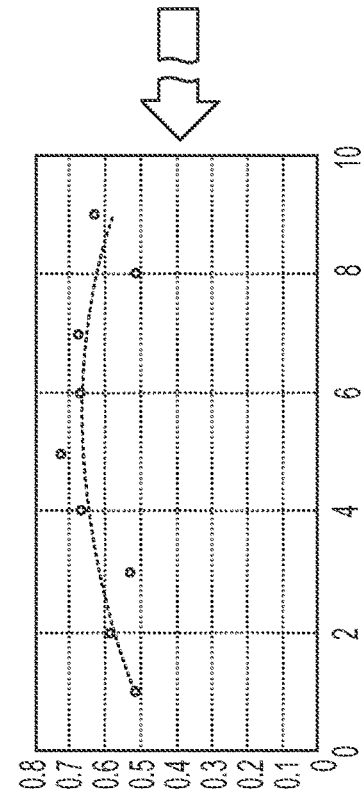
FIG. 8B
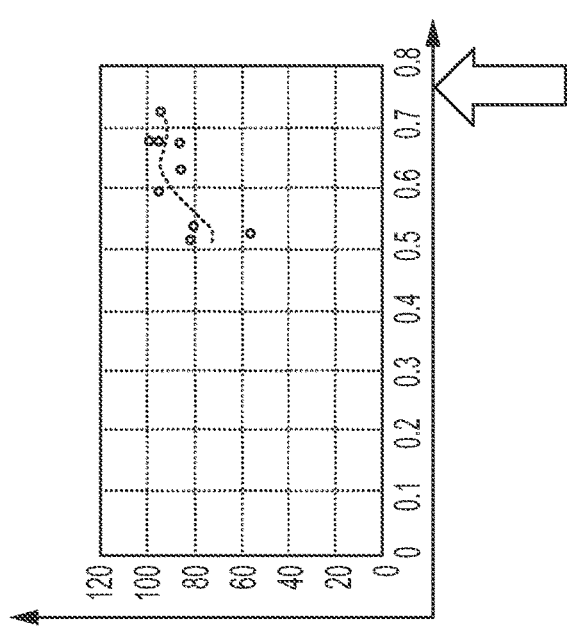
FIG. 8C
FIG. 8D

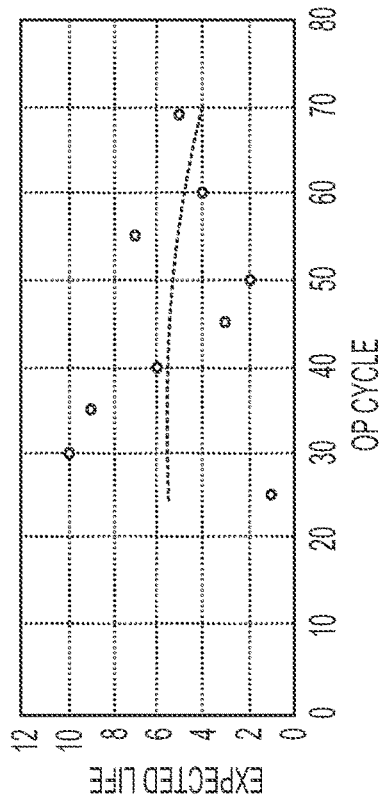
FIG. 9A
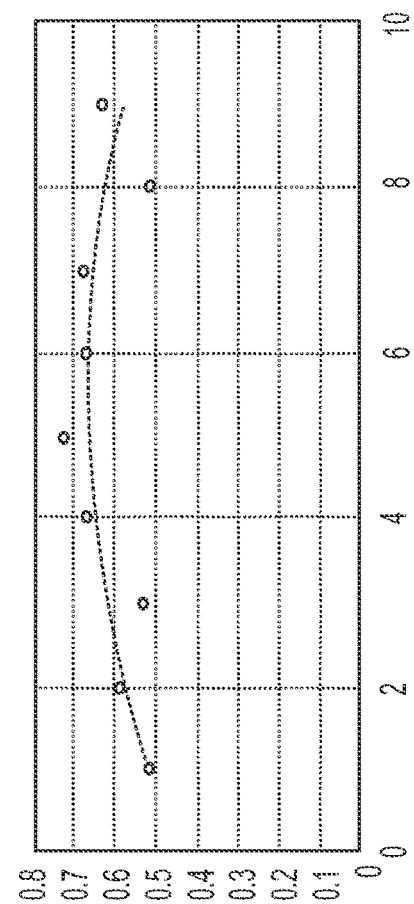
FIG. 9B
FIG. 9C
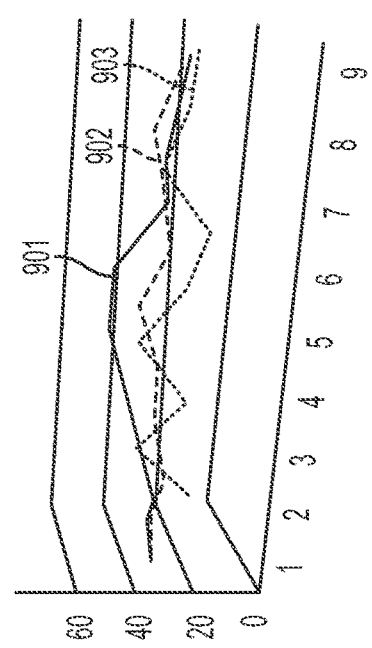
FIG. 9D

SYSTEM TO MANAGE ECONOMICS AND OPERATIONAL DYNAMICS OF IT SYSTEMS AND INFRASTRUCTURE IN A MULTI-VENDOR SERVICE ENVIRONMENT

CROSS REFERENCE TO RELATED APPLICATIONS

This application is a continuation application claiming priority to Ser. No. 15/820,696 filed Nov. 22, 2017, now U.S. Pat. No. 10,585,773 issued Mar. 10, 2020, the contents of which are hereby incorporated by reference.

BACKGROUND OF THE INVENTION

Technical Field

The present invention is a system to achieve to manage economics and operational dynamics of various information technology (IT) systems and infrastructure in a multi-vendor service environment.

Discussion of the Related Art

Currently IT infrastructure is heterogeneous with various kinds of compute devices, network devices and portable/hand held devices of various form, fit and function with various ownership levels including but not limited to company owned, outsourced and "Bring Your Own Device" devices. While each device in the infrastructure is capable of running beyond the supported end of life (EOL), the challenge is to efficiently run the system till the real end of life. When an error occurs or a part of a hardware fails, it is easy to throw the problem on to end of life of system, whereas analytic based root cause analysis can estimate and extend residual life with appropriate software changes, execution plans, change in hardware components etc. based on system performance including software and hardware.

Existing approaches to solving address this problem are concerned mostly with the data center infrastructure. The methods focus purely on software based failures as in cloud infrastructure, or hardware replacements at the data center endpoints. These systems and methods are limited from a user perspective because quality of service is impacted irrespective of where the device exists. The existing methods look at only part of the system environment.

SUMMARY

The present invention is a system to achieve to manage economics and operational dynamics of various IT systems and infrastructure in a multi-vendor service environment. A method is provided to manage economics and operational dynamics of various information technology (IT) systems. A computer collects data indicative of operation of a plurality of hardware components and collects data indicative of operation of a plurality of software components. The computer creates a first qualitative value representing a hardware status of the plurality of the hardware components and a second qualitative value representing a software status of the plurality of the software components. The first and second qualitative values are displayed in graphical form for evaluation by a system operator, and the computer computes a probability of life expectancy for the plurality of hardware components and the plurality of software components based on said first and second qualitative values and utilizing cognitive and artificial intelligence based calculations to determine the probability.

BRIEF DESCRIPTION OF THE DRAWINGS

The above and other aspects, features and advantages of several embodiments of the present invention will be more apparent from the following more particular description thereof, presented in conjunction with the following drawings. Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

FIG. 8a illustrates a data table for different sub-components utilized to calculate an expect risk score including variables, operational cycles and expected life as utilized by the expert system according to an embodiment of the present invention.

FIG. 8b illustrates a chart of operational cycle versus expected life based on the data table of FIG. 8a as utilized by the expert system according to an embodiment of the present invention.

FIG. 8c illustrates a chart of failure probability based on the data of FIGS. 8a and 8b according to an embodiment of the present invention.

FIG. 8d illustrates a chart of the expected risk score as determined by the expert system with the chart showing probability of particular failure mode (e.g. stuck mode) along the x-axis for a keyboard and the sub-component level of expected risk score along the y-axis according to an embodiment of the present invention.

FIG. 9a illustrates a data table for different sub-components utilized to calculate an ecosystem level expect risk score including variables, operational cycles and expected life as utilized by the expert system according to an embodiment of the present invention.

FIG. 9b illustrates a chart of operational cycle versus expected life based on the data table of FIG. 9a as utilized by the expert system according to an embodiment of the present invention.

FIG. 9c illustrates a chart of failure probability based on the data of FIGS. 9a and 9b according to an embodiment of the present invention.

FIG. 9d illustrates a chart of the component 901, system 902 and ecosystem 903 expected risk score as determined by the expert system according to an embodiment of the present invention.

DETAILED DESCRIPTION

Figure 1:
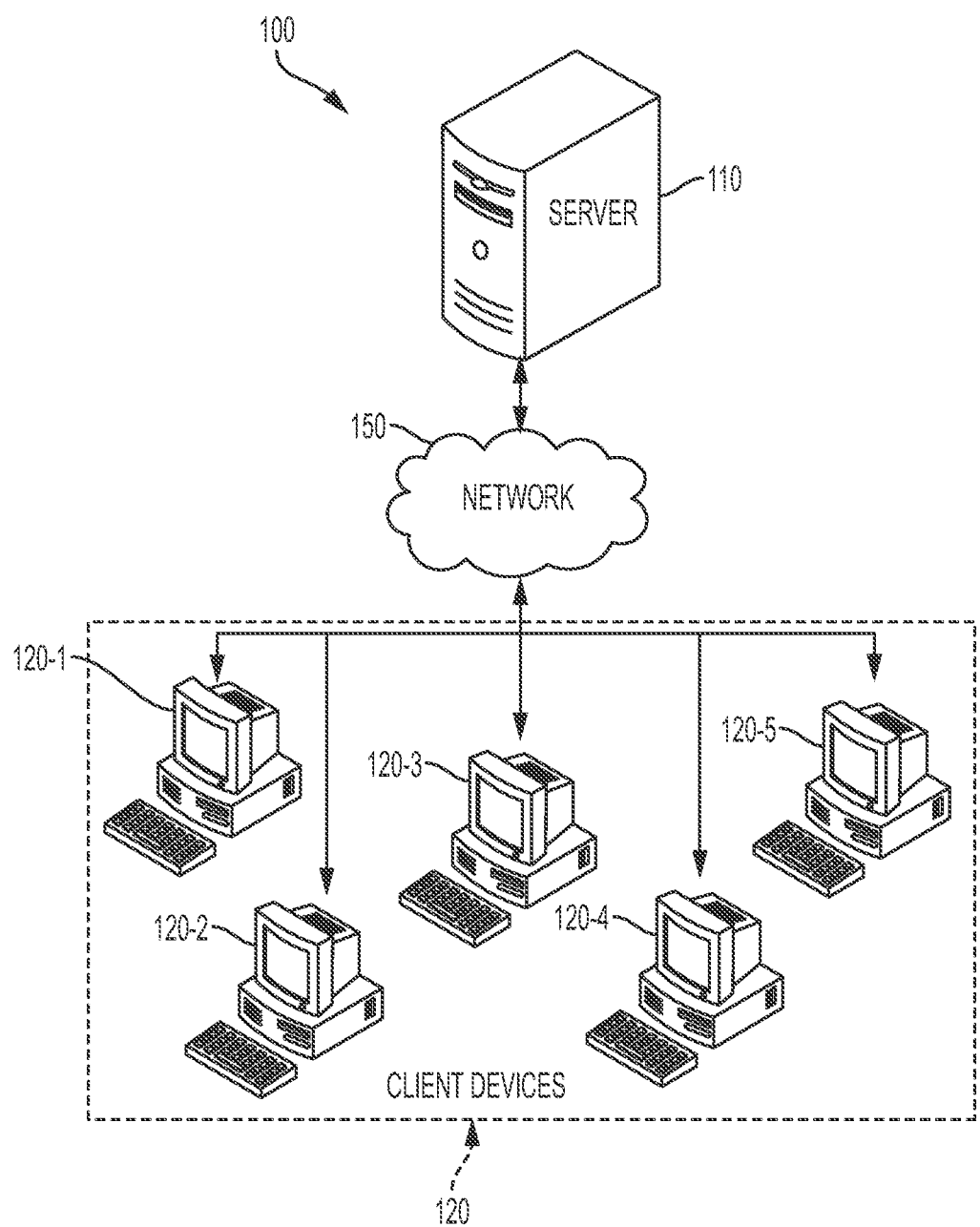
FIG. 1 illustrates a system for determining hardware life-expectancy based on historical data collection according to an embodiment of the present invention.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Real-time occurrences as referenced herein are those that are substantially current within the context of human perception and reaction.

In a computational/storage Information Technology (IT) infrastructure, especially in one composed of more than a single unit, for example, but not limited to, clusters of computers or cloud infrastructures, hardware components and software modules do not age uniformly. This is a result of many factors, including the fact that software and hardware components in a system do not have equal operational lifetime. For example, random-access memory (RAM) is expected to live longer than a hard disk. And a solid state drive (SSD) family hard disk is expected to live longer than a conventional (mechanical) hard disk. Another factor contributing to aging heterogeneity is the operational temperature of hardware components. Accordingly, operational temperature influences the life of all hardware components to various degrees, from shortening to potentially terminating them if they stay long periods in a danger zone. Furthermore, in some embodiments different hardware components are subjected to different operational temperatures. A need exists for a system and a method for accurately predicting a lifetime of individual hardware components such that preventive action may be taken in advance of system failure. A need also exists a system and a method to prolong the lifetime of a system of hardware components by accurately evaluating the degradation of each hardware component.

Environmental conditions such as outside temperature, ventilation, humidity and dust influence operational temperature, which in turn influences lifetime. Accordingly, environmental conditions may not equivalently impact all hardware components when environmental conditions are not uniform across the system. Another factor in the heterogeneous lifetime of hardware components is load, which is highly variable between hardware components. Load in a hardware component influences operational voltage and temperature, thus impacting the lifetime of the hardware component. In a multi-unit environment, such as a computer cluster, and especially in a cloud-like setup, aging of units is usually highly disproportionate. Some hardware components may stay idle for long periods of time and as such accumulate limited degradation, whereas other hardware components reach their end of life earlier than expected when used intensively.

Accordingly, a hardware component status is determined based on critical level values provided by a manufacturer combined with cumulative values, and adding a time dimension by considering a historical record of hardware component parameter values. Critical level values may be determined under test conditions by the manufacturer. In some embodiments, the critical level is similar to or substantially equal to a factory end of life (EOL) value. Cumulative values may be obtained from a historical record of parameter values stored within dedicated storage devices residing inside the equipment itself, or in a network server accessible to the equipment administrator. Accordingly, a system and a method as disclosed herein determine in timely fashion the life expectancy of equipment using a historical record of hardware component parameter values. Moreover, the determination of life expectancy is accurate because the method accounts for variations in the operational conditions of the equipment.

Embodiments disclosed herein quantify the degradation status of software and hardware components, making the result available for observation to both human and computation agents such as an Application Programming Interface (API). Determination of this life expectancy of computer software and hardware is accomplished by a compilation of statistical and factory information combined with accurate historical data about the actual operating parameters of specific software and hardware components. The historical data is acquired through specialized probe agents and stored in a centralized manner such that analysis and prediction can be formulated. Once formulated, appropriate predictions and alerts regarding the potential lifetime left in the software and hardware components are generated. Further, in some embodiments the probe agents use the prediction analysis to take preventive action ahead of upcoming failures in certain modules or parts of the system. Such preventive actions include increasing a sampling rate or generating alerts.

Some embodiments of the present disclosure quantify a degradation status of individual software and hardware components in a computer system. Accordingly, some embodiments include monitoring and recording parameter values of the hardware component across at least a portion of the hardware component lifetime. In some embodiments, the monitoring is continuous and spans the entire lifetime of the hardware component. More specifically, some embodiments combine data aggregates directly obtained from the hardware component with statistical information available through different sources, for each hardware component. Furthermore, some embodiments provide the results to probe agents (human or computational) for inspection and response, if desired. Some embodiments further provide estimates, predictions and alerts regarding the remaining lifetime in the hardware component, enabling observing agents to prepare for possible failures in certain parts of the system. In that regard, some embodiments further provide a method to prolong the usable life of the computer system by identifying problems affecting the life expectancy of each of the hardware components in the computer system before they fail. In some embodiments, a record of the operation parameters throughout the lifetime of the equipment is maintained with the aid of a low footprint probe agent that resides on each individual operating system. A central computing system residing on a server and having access to the record of the operation parameters computes comprehensive degradation values for the hardware components. The central computing system also generates reports and alerts long before the equipment fails or is about to fail, thus leaving ample time to prepare for hardware migration, if desired. The hardware maintenance model is prophylactic in that it provides corrective action prior to occurrence of a loss event. Having a record of the operation parameters through at least a portion of the lifetime of the hardware components enables methods and systems as disclosed herein to formulate an accurate prediction regarding the degradation status of the hardware components.

FIG. 1 illustrates a system 100 for determining hardware life expectancy based on historical data collection, according to an embodiment of the present invention. System 100 includes a server 110 and client devices 120-1 through 120-5 coupled over a network 150. Each of client devices 120-1 through 120-5 (collectively referred to hereinafter as client devices 120) is configured to include a plurality of hardware components. Client devices 120 can be, for example, a tablet computer, a desktop computer, a server computer, a data storage system, or any other device having appropriate processor, memory, and communications capabilities. Server 110 can be any device having an appropriate processor, memory, and communications capability for hosting information content for display. The network 150 can include, for example, any one or more of a TCP/IP network, a personal area network (PAN), a local area network (LAN), a campus area network (CAN), a metropolitan area network (MAN), a wide area network (WAN), a broadband network (BBN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
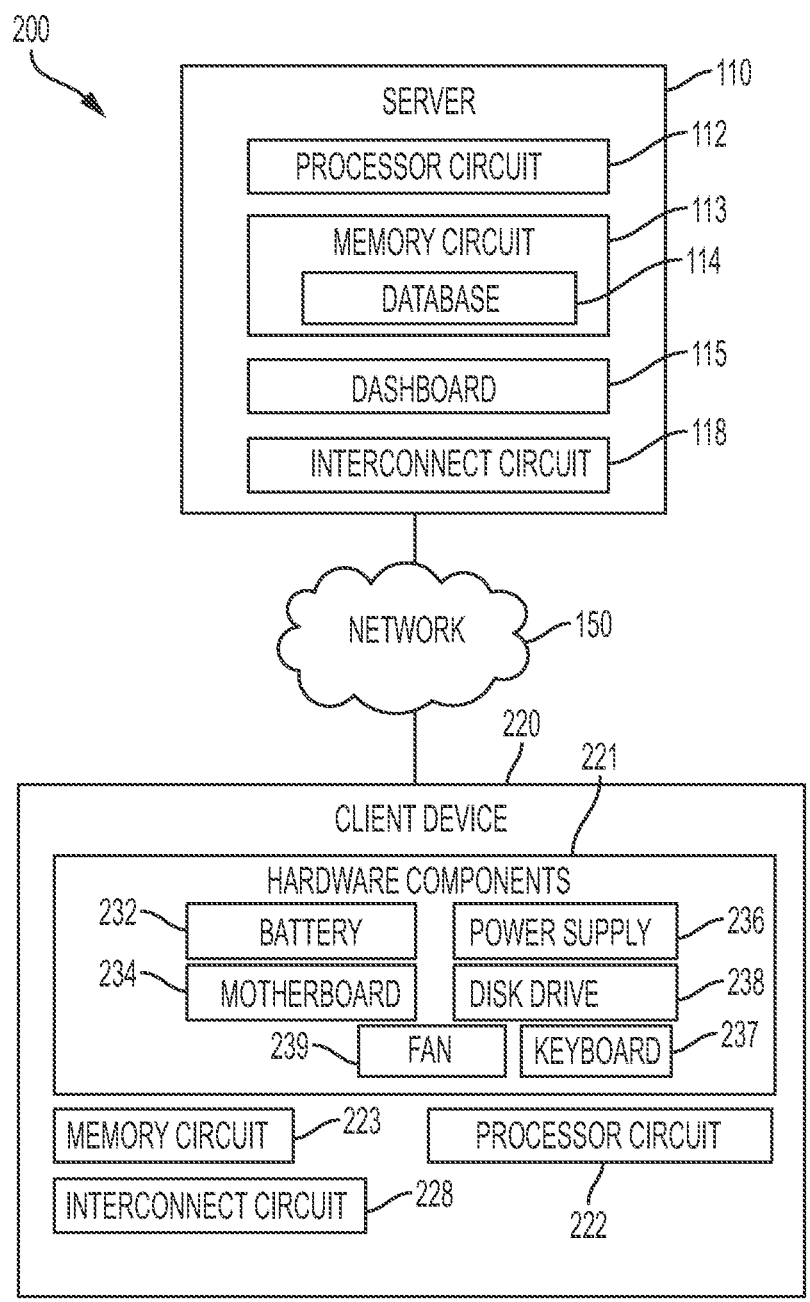
FIG. 2 illustrates a server and a computing device coupled through a network in a system for determining hardware and software life-expectancy according to an embodiment of the present invention.

FIG. 2 illustrates a server 110 and a computing device 220 coupled through network 150 in a system 200 for determining software and hardware life expectancy according to an embodiment of the present invention. Server 110 includes a processor circuit 112, a memory circuit 113, a dashboard 115, and an interconnect circuit 118. Processor circuit 112 is configured to execute commands stored in memory circuit 113 so that server 110 performs steps in methods consistent with the present disclosure. Interconnect circuit 118 is configured to couple server 110 with network 150, so that remote users can access server 110. Accordingly, interconnect circuit 118 can include wireless circuits and devices, such as Radio-Frequency (RF) antennas, transmitters, receivers, and transceivers. In some embodiments, interconnect circuit 118 includes an optical fiber cable, or a wire cable, configured to transmit and receive signals to and from network 150. Memory circuit 113 can also store data related to client device 220 in a database 114. For example, database 114 can include historical operation data from at least one of the plurality of hardware components. Server 110 includes a dashboard 115 to provide a graphic interface with a user for displaying information stored in database 114 and to receive input from the user.

Client device 220 includes a plurality of hardware components 221, a processor circuit 222, a memory circuit 223, and an interconnect circuit 228. In some embodiments client device 220 is a redundancy system and hardware components 221 are redundancy units. In some embodiments, client device 220 is a backup system and hardware components 221 are backup units. In that regard, the backup system may be configured to dynamically store large amounts of information from a plurality of computers forming a local area network (LAN). Accordingly, in some embodiments, client device 220 is configured to store large amounts of information for long periods of time, and provide dynamic access, read, write, and update operations to the stored information. For example, a redundancy system or a backup system can include a server computer coupled to a local area network (LAN) to service a plurality of computers in a business unit. In some embodiments hardware components 221 include a battery 232, a motherboard 234, a power supply 236, keyboard 237, at least one disk drive 238, and at least one fan 239. More generally, hardware components 221 may include any hardware device installed in client device 220. In some embodiments, hardware components 221 include a RAID, or a plurality of memory disks configured to backup massive amounts of data. Moreover, in some embodiments hardware components 221 include a plurality of processor circuits 222 such as central processing units (CPUs). In some embodiments, hardware components 221 are configured to measure and report parameters that can influence their lifetime. For example, disk drive 238 may include hard disks having SMART (Self-Monitoring, Analysis and Reporting Technology) data including, but not limited to, values for rotation speed, temperature, spin up time, Input/Output (IO) error rate, and total time of operation. Likewise, CPUs in hardware components 221 can report load values (in percentage), voltage and operational temperature. Motherboard 234 can report operational temperatures, and voltages to server 110. Power supply 236 can report operational temperature, voltage and current values. Fan 239 can report on its speed. Each of these parameters influence degradation (e.g., wear) as a function of momentary values and time.

Within each individual client device 220, each elementary hardware component 221 has a unique identification (ID). The hardware component ID can include any or a combination of: component type, manufacturer name, manufacturer ID, serial number, or any other available information. Accordingly, the hardware component ID transcends operating system re-installation. That is, the hardware component ID is independent from a specific value used by an operating system installed in memory circuit 223 and executed by processor circuit 222. More generally, processor circuit 222 is configured to execute commands stored in memory circuit 223 so that client device 220 performs steps in methods consistent with the present disclosure. Interconnect circuit 228 is configured to couple client device 220 with network 150 and access server 110. Accordingly, interconnect circuit 228 can include wireless circuits and devices, such as Radio-Frequency (RF) antennas, transmitters, receivers, and transceivers, similarly to interconnect circuit 118 in server 110. Interconnect circuit 228 can include a plurality of RF antennas configured to couple with network 150 via a wireless communication protocol, such as cellular phone, blue-tooth, IEEE 802.11 standards (such as WiFi), or any other wireless communication protocol as known in the art.

Figure 3:
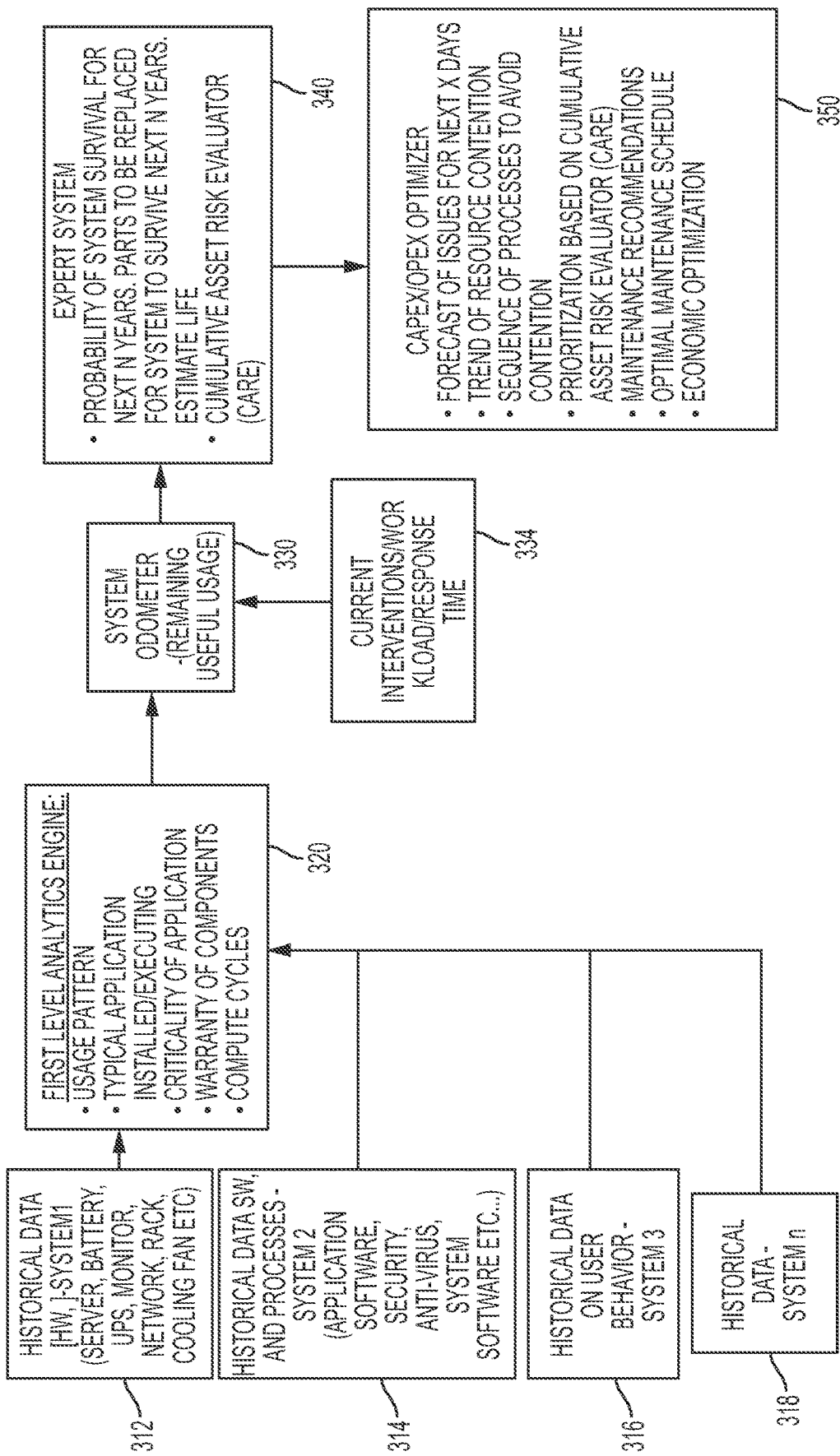
FIG. 3 is a flowchart showing an overview of the proposed system to achieve the system to manage economics and operational dynamics of various IT systems and infrastructure in a multi-vendor service environment according to an embodiment of the present invention.

FIG. 3 is a flowchart showing an overview of the proposed system to achieve the system to manage economics and operational dynamics of various IT systems and infrastructure in a multi-vendor service environment according to an embodiment of the present invention. At the outset, historical data is collected. The historical data includes hardware historical data 312, software historical data 314, user behavior historical data 316, and system historical data 318. The collected data is then delivered to a first level analytics engine 320 which analyzes usage patterns, typical application installation and execution, criticality of application software, warranty of hardware components, and compute cycles. The data analyzed by the analytics engine at step 320 is then delivered to the system odometer 330 along with real-time current data 334 related to workload, response time, and intervention. Further details about the system odometer will be provided below.

The output of the system odometer 330 is then delivered to the expert system 340 where the probability of system survival for the next 'N' years is calculated. Thus, the expert system 340 will provide an evaluation of parts and software to be replaced for the system to survive the next 'N' years, which is essentially the estimated life expectancy for the hardware and software. The expert system 340 further provides a cumulative asset risk evaluator (CARE) which assembles life-expectancy data from the system odometer 330 and provides a risk evaluator.

Lastly, a Capex/Opex Optimizer 350 will forecast issues for the next 'X' days, create a trend of resource contentions, create a sequence of processes to avoid contentions (e.g., failures), create prioritization based on the cumulative asset risk evaluator (CARE). The optimizer 350 will further provide maintenance recommendations, an optimal maintenance schedule, and economic optimization details. It is noted that an operating expense, operating expenditure, operational expense, operational expenditure or OPEX is an ongoing cost for running a product, business, or system. Its counterpart, a capital expenditure (CAPEX), is the cost of developing or providing non-consumable parts for the product or system.

Figure 4:
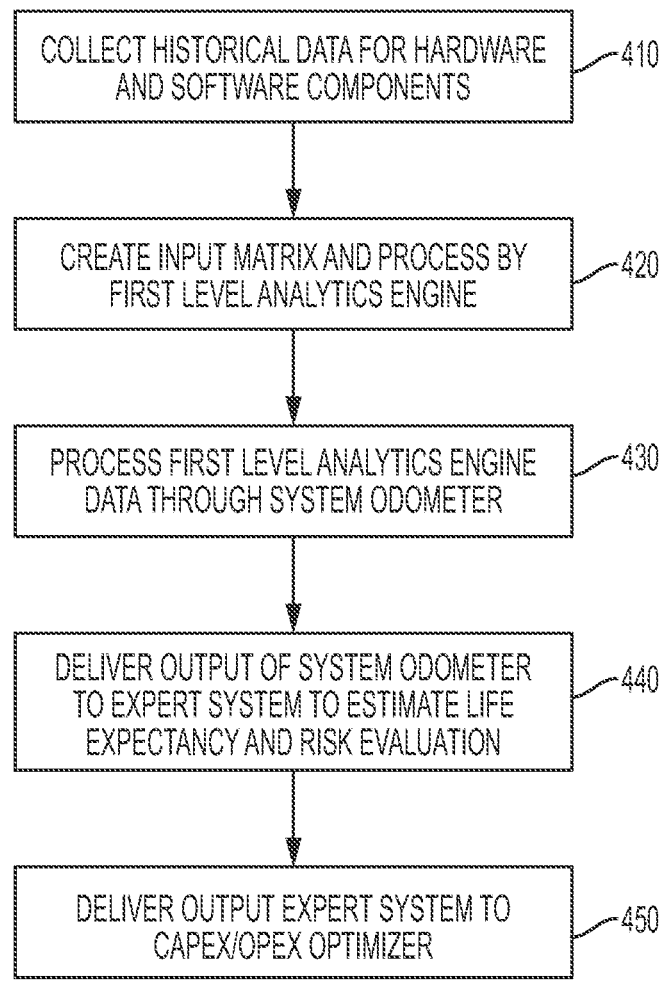
FIG. 4 is a flowchart showing steps to accomplish an embodiment of the present invention.

FIG. 4 is a flowchart showing steps to accomplish an embodiment of the present invention. At step 410, historical data of hardware at issue is sourced and analyzed to provide a usage pattern and components criticality. The historical data includes hardware historical data, software historical data, user behavior historical data, and system historical data. Step 410 is a partially generic step with additional modeling framework because currently none of solutions provide analytics and the generic closed form relations may be utilized as a part of the present invention. The modeling framework extracts input parameters from sub-system such as keyboard, server/system, battery, and monitor, for example. These inputs are number of flickers, key-board response time, battery charging rate, charge hold time over time, CPU/memory utilization, temperature, fan status, availability, latency (ping round trip time), packet loss, frequency of incidents, mean time to repair, key performance indicators (KPI) threshold deviations, number of anomalies, events/log data, business criticality.

At step 420, an input matrix is created from these inputs and processed by the first level analytics engine 320 (see FIG. 3). The system will form the correlation and criticality of input matrix and state matrix with outputs of each component, as well as the server/system.

Principal component analysis (PCA) will be applied to create dominant features and regenerating input and state matrices. PCA is a statistical procedure that uses an orthogonal transformation to convert a set of observations of possibly correlated variables into a set of values of linearly uncorrelated variables called principal components (or sometimes, principal modes of variation). The number of principal components is less than or equal to the smaller of the number of original variables or the number of observations. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables.

At step 430, output from step 420 is input into a System Odometer 330 which provides the remaining useful usage and in sync with current interventions, workload, and response times.

The system at step 430 creates a conglomeration of inputs of all forms, including structured as well unstructured. The conventional systems do not provide tool or means to create cloud of inputs. Thus, this is new method derived from combination of various data exploration techniques such as PCA, NLP, Rescaling, FFT, orthogonality etc. Thus, the invention utilizes F(PCA, NLP, Rescaling, FFT, Orthogonality, vector transformation) on data sources (structured, random, unstructured). The output of step 430 is normalized input matrix.

Following the same parameters and techniques describe above, the system states and inputs metrics are computed.

A set-of analytics model form the relation between the set of inputs and outputs stated; e.g., probability of malfunction and failure, number of similar historical events, etc. To accomplish this step regarding the input and state matrix, the data is passed through first a "fuzzy system" that gives dynamic limits on system conditions. The input and state matrix are applied on hybrid model of information retrieval/knowledge base for unstructured data, Classification and regression trees (CART) are applied on event data. Decision Trees are commonly used in data mining with the objective of creating a model that predicts the value of a target (or dependent variable) based on the values of several input (or independent variables). Classification and regression tree (CART) analysis recursively partitions observations in matched data set, consisting of a categorical (for classification trees) or continuous (for regression trees) dependent (response) variable and one or more independent (explanatory) variables, into progressively smaller groups.

Outputs of all these models are applied as inputs to Adaptive Neural Network (ANN), current interventions, actions, remedies applied are also used as inputs to ANN. ANN is residual useful life, Trend of resource orientation.

Based on probable "state-transition", past event taken place, frequency of events, probability of event/failure/malfunction etc., the MIMO [multi input multi output] model would provide remaining or residual useful life (RUL). This phase does not use MIMO model, MIMO is used for ANN which has multiple inputs and multiple outputs. RUL is not residual useful life based on time unlike in traditional definitions, here RUL is considered as life based on the feature interactions and usage patterns of system and subsystems.

"System Odometer" is a term coined after development of this invention, although the term odometer is commonly used in automotive.

Basic functions of system odometer are to calculate end of life parameters and display same as one might see in fuel odometers in car. For example, a hardware component such as keyboard has various failure modes, one of failure mode is "stuck key" which can be characterized by the time response of key input on screen, feel and pressure on the fingers which may be measured by strain gauges underneath keys, rate of change of key stroke per seconds, sound intensity of stroked key, etc.

The block upstream of the odometer calculates as featured above using combination of methods mentioned such as PCA, logistic regression, closed loop correlation, FFT etc. Then odometer block forms closed loop relation such as inputs (e.g., X) are features mentioned above and response or output (e.g., Y) is "stuck key." The system odometer then forms a probability density function of Y versus X, calculates for every real time data from a hardware system around keyboard, number of times probability has exceeded pre-calibrated threshold value for this failure mode. If continuously over time, the failure rate is above threshold for more than pre-defined intervals then that particular "key" in the keyboard system is alerted as end of life (EOL) and intensity is shown graphically on screen through the system odometer. The same logic above is extended to all hardware and software components that are mentioned.

At step 440, the system odometer 330 data is delivered to the expert system 340 as a PDF value, which relate to the Ys, Xs computed above of each hardware and software components.

More specifically and with reference to FIG. 3, output from system odometer 330 is provided as input to the "Expert System" for computing probability of system survival for next N years, Parts to be replaced for system to survive next N years, Estimate Life, Trend of resource contention, Sequence of processes to avoid contention, Prioritization based on Cumulative Asset Risk Evaluator (CARE), Maintenance recommendations, Optimal Maintenance schedule, Economic Optimization, Probability of system survival for next N years, and parts to be replaced for system to survive next N years as an estimate of life expectancy.

As shown in FIG. 3, the expert system comprises combination of (8 ANN+8 multivariate regression models), a ranking system, a PDF generator, Bayesian model, a CARE system and the expert system generates outputs mentioned above. More specifically, the cumulative asset risk evaluator provides a system whereby a risk score is calculated for each asset based on the significant variables which influence the life of the asset. Variables like CPU/memory utilization, temperature, fan status, availability, latency (ping round trip time), packet loss, frequency of incidents, mean time to repair, KPI threshold deviations, number of anomalies, and events/log data are processed by the expert system 340. Business criticality is used as input for computing the risk scores. The risk score signifies the intensity of the problem for the asset and helps to prioritize the asset for further actions like maintenance, refresh etc. Techniques like multivariate regression/neural networks may be applied on historic data to train and test the risk scoring analytical models. Risk score is computed at each individual asset level.

Individual Asset Risk Score1=$\beta_{0a1}+\beta_{1a1}X_{1a1}+\beta_{2a1}X_{2a1}+\ldots+\beta_{na1}X_{na1}$ (where $\beta_{0a1}$, $\beta_{1a1}$ etc. are coefficients determined by techniques like regression and $X_{1a1}$, $X_{2a1}$ etc. are the variables). A cumulative Asset Risk Score is calculated which is a regression of the individual asset risk scores and which provides the overall risk to the ecosystem. The Cumulative Asset Risk Score=$\Theta_0+\Theta_1$ Risk Score$_{a1}+\Theta_2$ Risk Score$_{a2}+\ldots+\Theta_n$ Risk Score$_{an}$ (where $\Theta_0$, $\Theta_1$ are the coefficients determined by techniques like regression and Risk Score$_{a1}$, Risk Score$_{a2}$ etc. are the risk score for each asset).

The above steps constitute Cumulative Asset Risk Evaluator (CARE).

Output from 440 is provided as input to Capex/Opex Optimizer 350 which computes to give the final output which can be used by a system administrator to take further action. All of these analytics engines provide a final engine that includes cognitive and AI based systems and provides following: forecast of issues for next X days, trend of resource contentions, sequence of processes to avoid contention, maintenance recommendations, optimal maintenance schedule, and economic optimization. These computations are accomplished in the same manners as described above with respect to the analytics engine 320 and the system odometer 330.

Figure 4A:
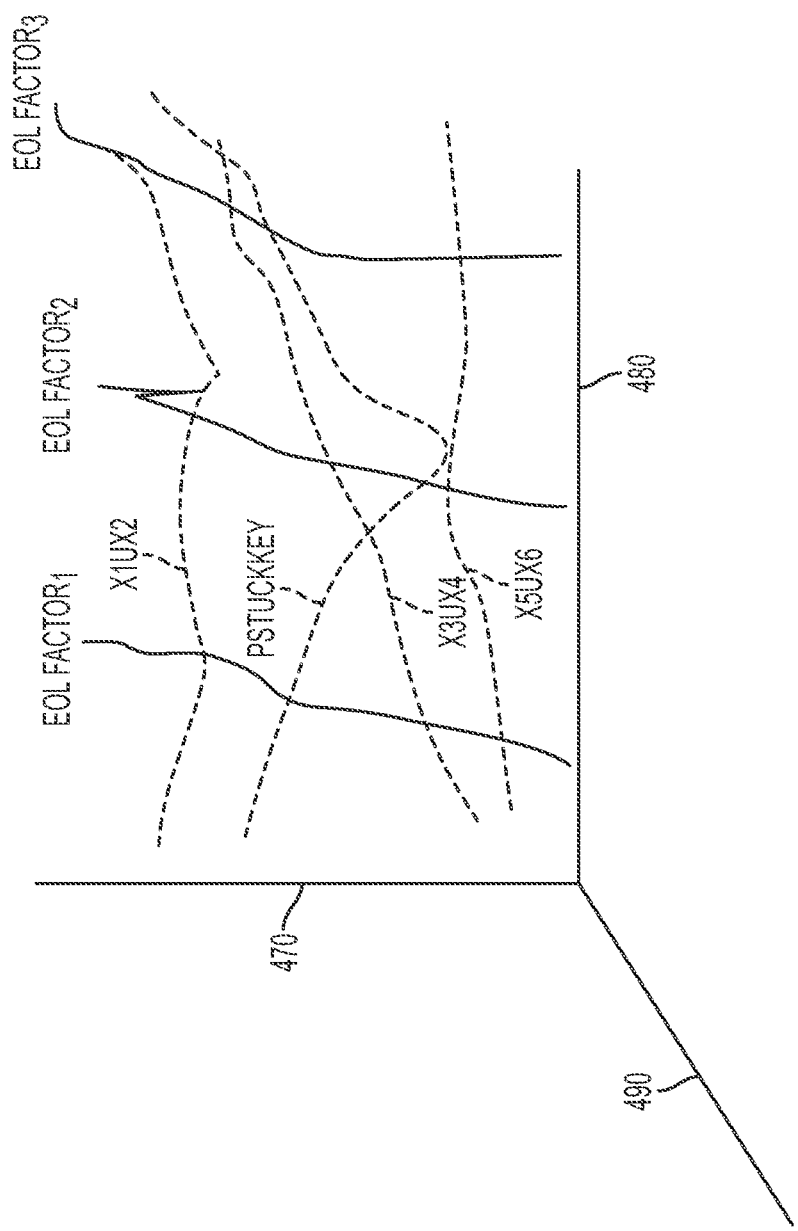
FIG. 4A illustrates a three dimensional computation of the probability of stuck key according to an embodiment of the present invention.

FIG. 4a illustrates a three dimensional computation of the probability of stuck key according to an embodiment of the present invention. The three dimensional computation illustrated by FIG. 4a of the probability of a stuck key (P_stuckkey) is computed using the model—EF [Environmental factors] curves which are generated with respect to time and P_stuckkey is calibrated along acceptable EF curve. The keyboard independent variables 470 represented along the Y-axis are the time response of key input on screen (x1), feel/pressure on the fingers (x2), which may be measured by strain gauges underneath keys, the rate change of key stroke per seconds (x3), the sound intensity of stroked key (x4), the number of maintenance (x5), and past replacement if any (x6). The dependent variables 480 represented along the X-axis are the EOL factor, RUL factor, and "stuck key". The environmental factors 490 represented along the Z-axis may include geography, temperature, altitude, number of users, humidity, design parameters, and specified life cycle.

Figure 4B:
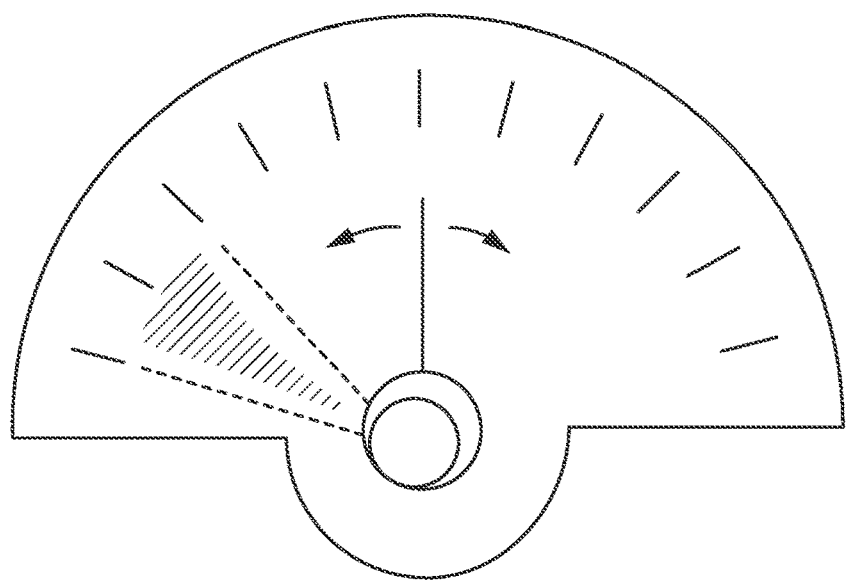
FIG. 4B illustrates an example of the odometer system provided by this invention whereby individual and cumulative performance rates of hardware and software components are displayed visually for an operator according to an embodiment of the present invention.
Figure 4B:
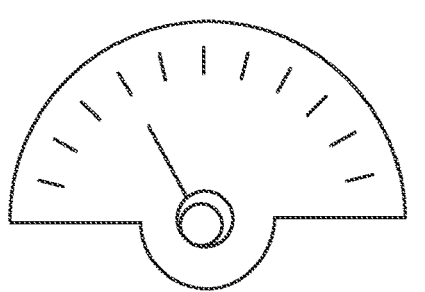
Figure 4B:
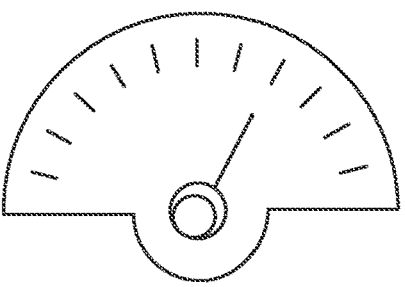
Figure 4B:
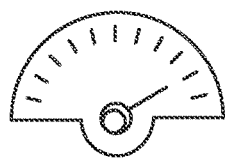
Figure 4B:
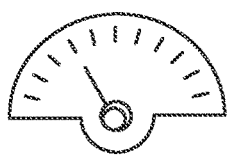
Figure 4B:
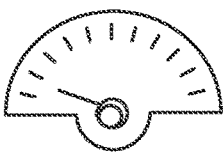
Figure 4B:
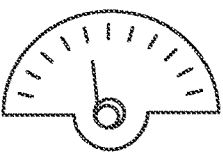
Figure 4B:
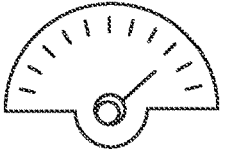
Figure 4B:
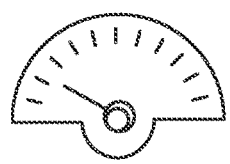
Figure 4B:
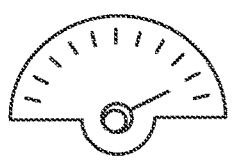
Figure 4B:
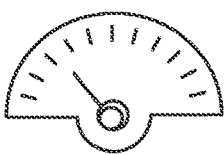
Figure 4B:
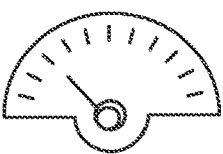
Figure 4B:
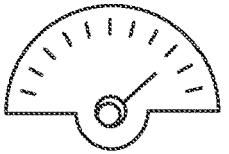

FIG. 4B illustrates an example of the odometer system provided by this invention whereby individual and cumulative performance rates of hardware and software components are displayed visually for an operator according to an embodiment of the present invention. Individual hardware components are shown with the designation Hardware X1, Hardware X2, etc., and individual software components are shown with the designation Software Y1, Software Y2, etc. The cumulative function of all hardware components are also illustrated by an odometer next to the similar odometer for all software components. The overall system odometer is likewise illustrated at the top of the screen of FIG. 4B.

Figure 4C:
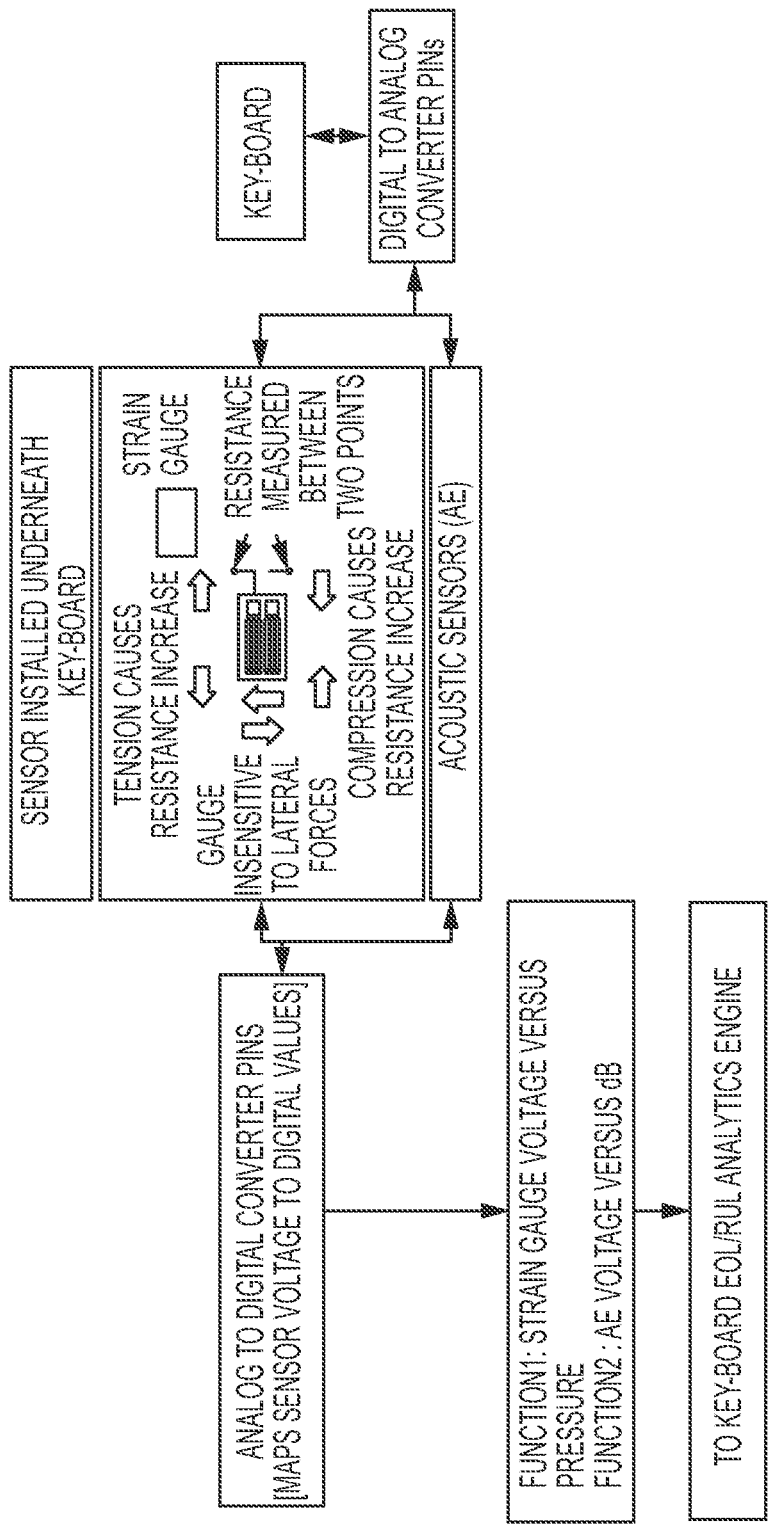
FIG. 4C illustrates an example of a sensor and data collection system for a keyboard in accordance with an embodiment of the present invention.

FIG. 4C illustrates an example of a sensor and data collection system for a keyboard in accordance with an embodiment of the present invention.

Figure 5:
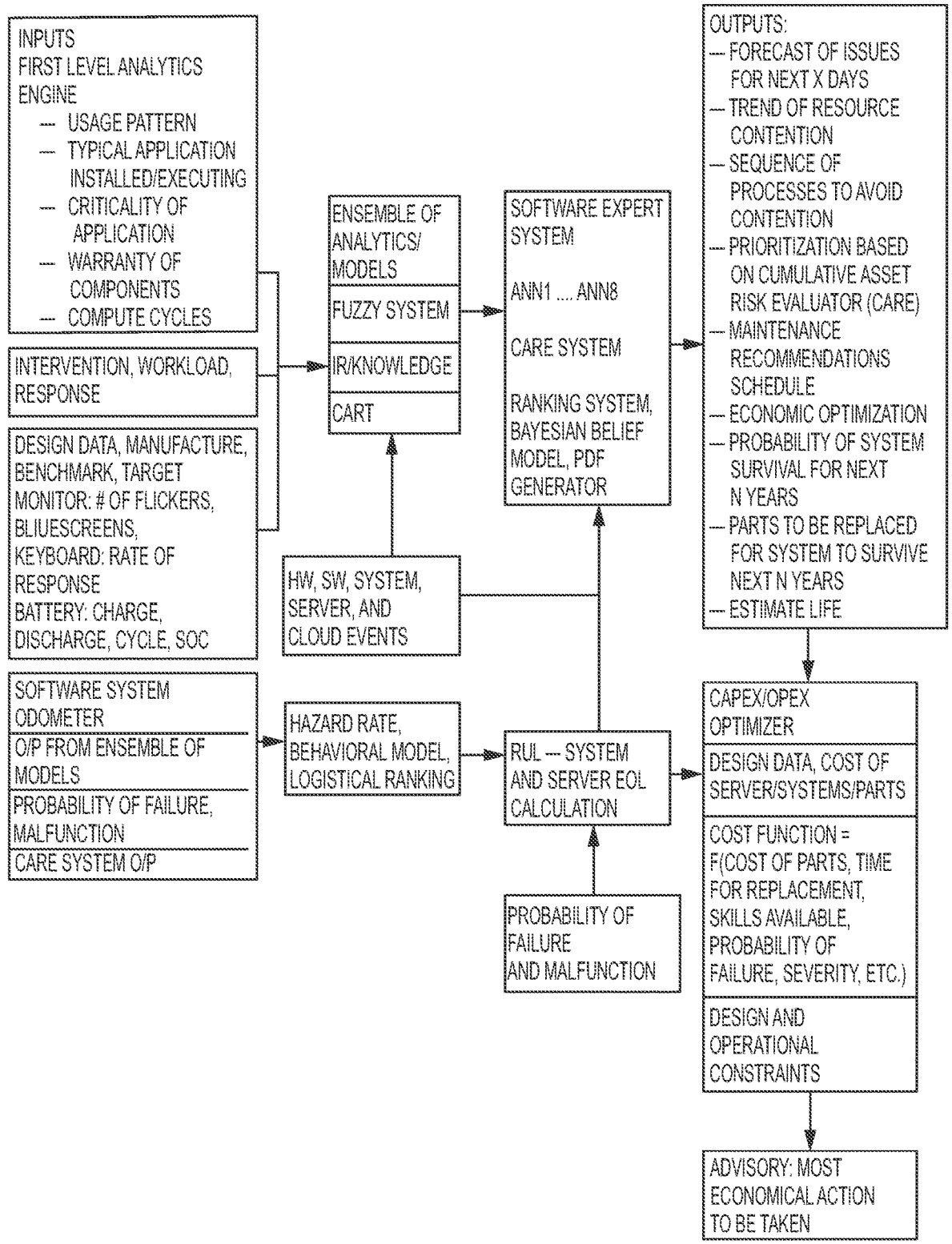
FIG. 5 illustrates an alternate embodiment of the present invention with the components illustrated in FIG. 3 rearranged to provide the most economical output suitable for use by the system administrator.

FIG. 5 illustrates an alternate embodiment of the present invention with the components illustrated in FIG. 3 rearranged to provide the most economical output suitable for use by the system administrator.

Figure 6:
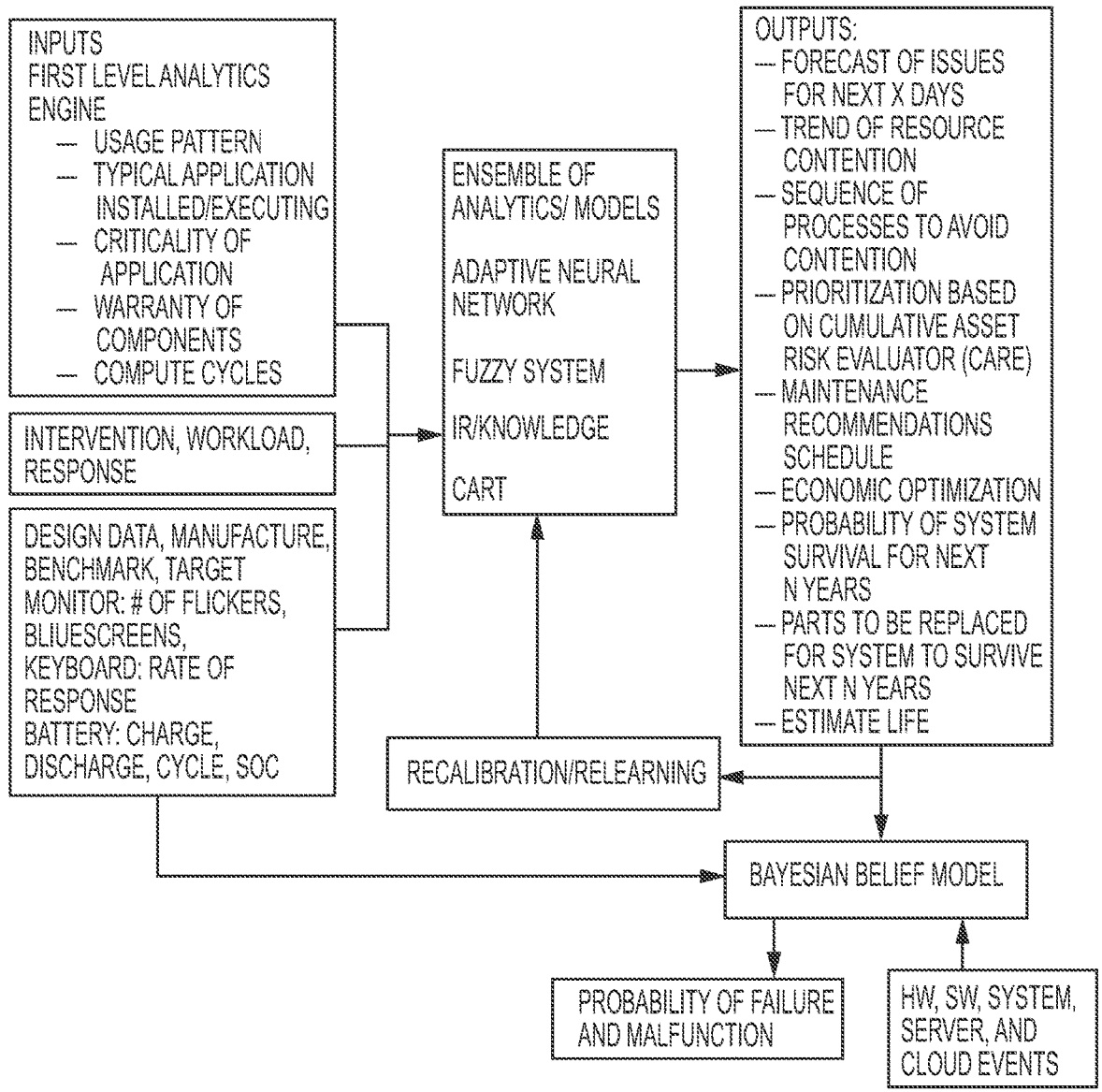
FIG. 6 illustrates a further alternate embodiment of the present invention with the components illustrated in FIG. 3 rearranged to provide the most economical output suitable for use by the system administrator.

FIG. 6 illustrates a further alternate embodiment of the present invention with the components illustrated in FIG. 3 rearranged to provide the most economical output suitable for use by the system administrator.

Figure 7:
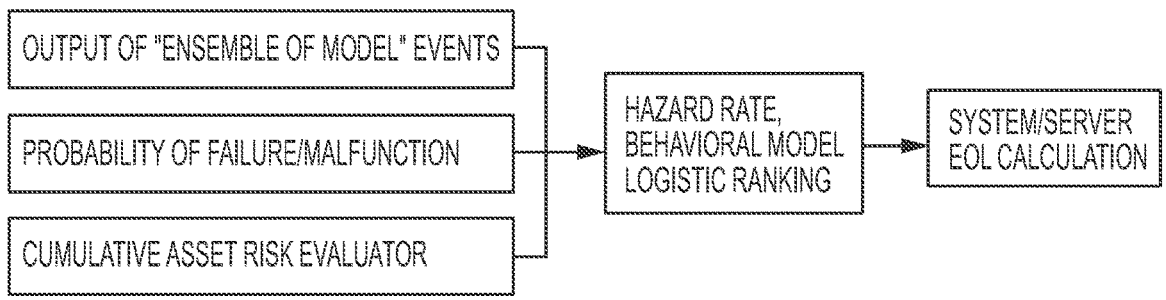
FIG. 7 illustrates the schematic representation of the processing of data as processed various techniques described above to produce a system/server end of life calculation.

FIG. 7 illustrates the schematic representation of the processing of data as processed various techniques described above to produce a system/server end of life calculation.

FIG. 8a illustrates a data table for different sub-components utilized to calculate an expect risk score including variables, operational cycles and expected life as utilized by the expert system according to an embodiment of the present invention. The data is associated with subcomponent parameter values shown in the exemplary table below:

FIG. 9d illustrates a chart of the component expected risk score 901, system expected risk score 902 and ecosystem expected risk score 903 as determined by the expert system according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated

| Date | Time | Subcomp. | Comp. | Variable 1 | Var. 2 | Environ. variable 1 | Environ. variable 2 | Variable N-1 | Variable N | Error code |
|---|---|---|---|---|---|---|---|---|---|---|
| Nov. 10, 2017 | 13:45 | C4-1 | C4 | 0.049902851 | 71 | 8 | 45 | 11 | 115 | No error |
| Nov. 10, 2017 | 14:00 | C4-1 | C4 | 0.240420913 | 55 | 5 | 30 | 12 | 95 | No error |
| Nov. 10, 2017 | 14:15 | C4-1 | C4 | 0.427968711 | 57 | 20 | 44 | 11 | 116 | No error |
| Nov. 10, 2017 | 14:30 | C4-1 | C4 | 0.252930392 | 66 | 9 | 34 | 14 | 96 | No error |
| Nov. 10, 2017 | 14:45 | C4-1 | C4 | 0.709874182 | 75 | 9 | 25 | 25 | 108 | Err 1 |
| Nov. 10, 2017 | 15:00 | C4-1 | C4 | 0.724690797 | 72 | 15 | 27 | 13 | 111 | No error |
| Nov. 10, 2017 | 15:15 | C4-1 | C4 | 0.232773761 | 65 | 14 | 34 | 17 | 95 | No error |
| Nov. 10, 2017 | 15:30 | C4-1 | C4 | 0.885841611 | 57 | 9 | 31 | 25 | 96 | No error |
| Nov. 10, 2017 | 15:45 | C4-1 | C4 | 0.85722246 | 60 | 8 | 32 | 18 | 110 | No error |
| Nov. 10, 2017 | 16:00 | C4-1 | C4 | 0.722683637 | 66 | 8 | 36 | 10 | 114 | No error |
| Nov. 10, 2017 | 16:15 | C4-1 | C4 | 0.585198872 | 57 | 16 | 42 | 7 | 106 | Err 5 |
| Nov. 10, 2017 | 16:30 | C4-1 | C4 | 0.408574515 | 69 | 16 | 45 | 19 | 119 | No error |
| Nov. 10, 2017 | 16:45 | C4-1 | C4 | 0.632541323 | 69 | 7 | 32 | 31 | 111 | No error |
| Nov. 10, 2017 | 17:00 | C4-1 | C4 | 0.046076432 | 55 | 11 | 40 | 7 | 118 | No error |
| Nov. 10, 2017 | 17:15 | C4-1 | C4 | 0.903746877 | 62 | 14 | 35 | 31 | 95 | Err 4 |
| Nov. 10, 2017 | 17:30 | C4-1 | C4 | 0.424761098 | 70 | 15 | 28 | 29 | 99 | No error |

FIG. 8b illustrates a chart of operational cycle versus expected life based on the data table of FIG. 8a as utilized by the expert system according to an embodiment of the present invention. FIG. 8c illustrates a chart of failure probability based on the data of FIGS. 8a and 8b according to an embodiment of the present invention. FIG. 8d illustrates a chart of the expected risk score as determined by the expert system with the chart showing probability of particular failure mode (e.g. stuck mode) along the x-axis for a keyboard and the sub-component level of expected risk score along the y-axis according to an embodiment of the present invention.

FIG. 9a illustrates a data table for different sub-components utilized to calculate an ecosystem level expect risk score including variables, operational cycles and expected life as utilized by the expert system according to an embodiment of the present invention. FIG. 9b illustrates a chart of operational cycle versus expected life based on the data table of FIG. 9a as utilized by the expert system according to an embodiment of the present invention. FIG. 9c illustrates a chart of failure probability based on the data of FIGS. 9a and 9b according to an embodiment of the present invention.

circuit, such as for example an Application Specific Integrated Circuit (ASIC), designed for only implementing methods of the present invention).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

It is understood in advance that although this disclosure includes a detailed description on conventional networks and cloud computing networks, implementation of the teachings recited herein are not limited to any particular computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization and may be managed by the organization or a third party and may exist on-premises or off-premises.

Community cloud: the cloud infrastructure is shared by several organizations and supports a specific community that has shared concerns (e.g., mission, security requirements, policy, and compliance considerations) and may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
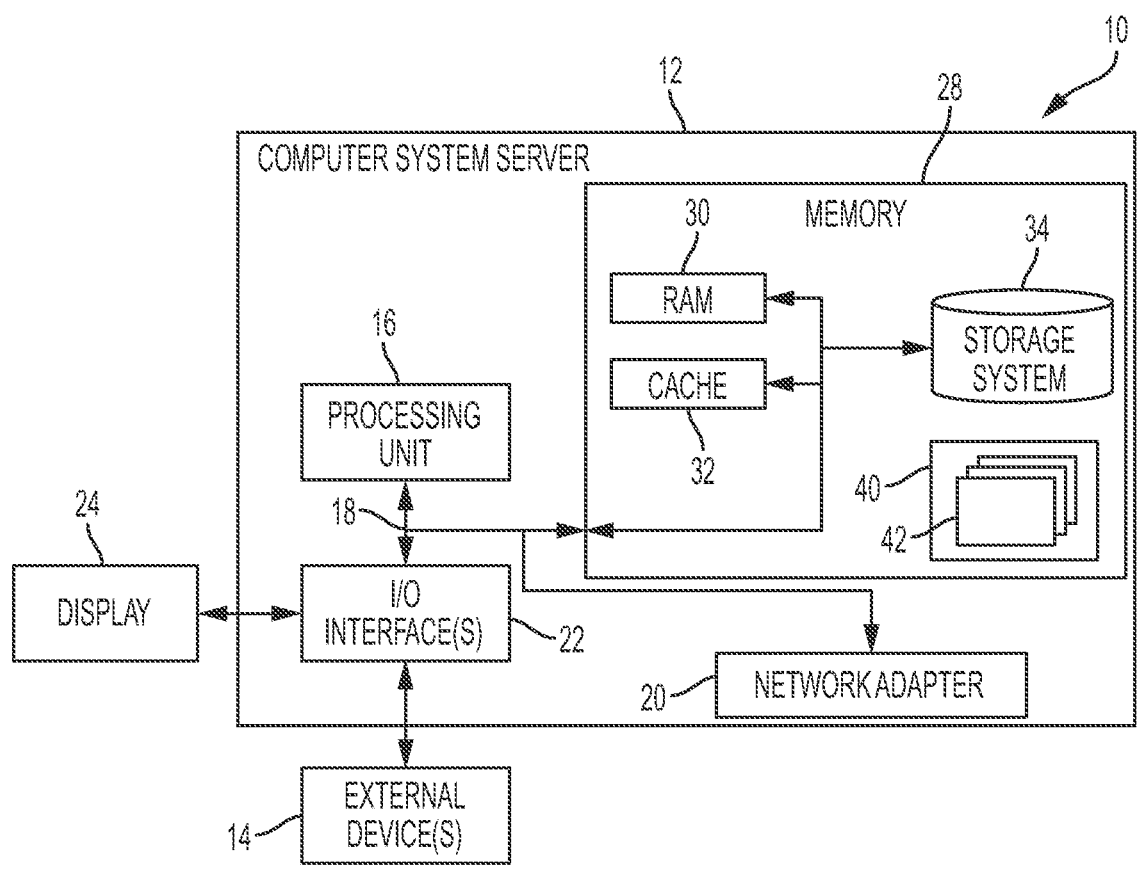
FIG. 10 depicts a cloud computing node according to an embodiment of the present invention.

FIG. 10 depicts a cloud computing node according to an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12 and may include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
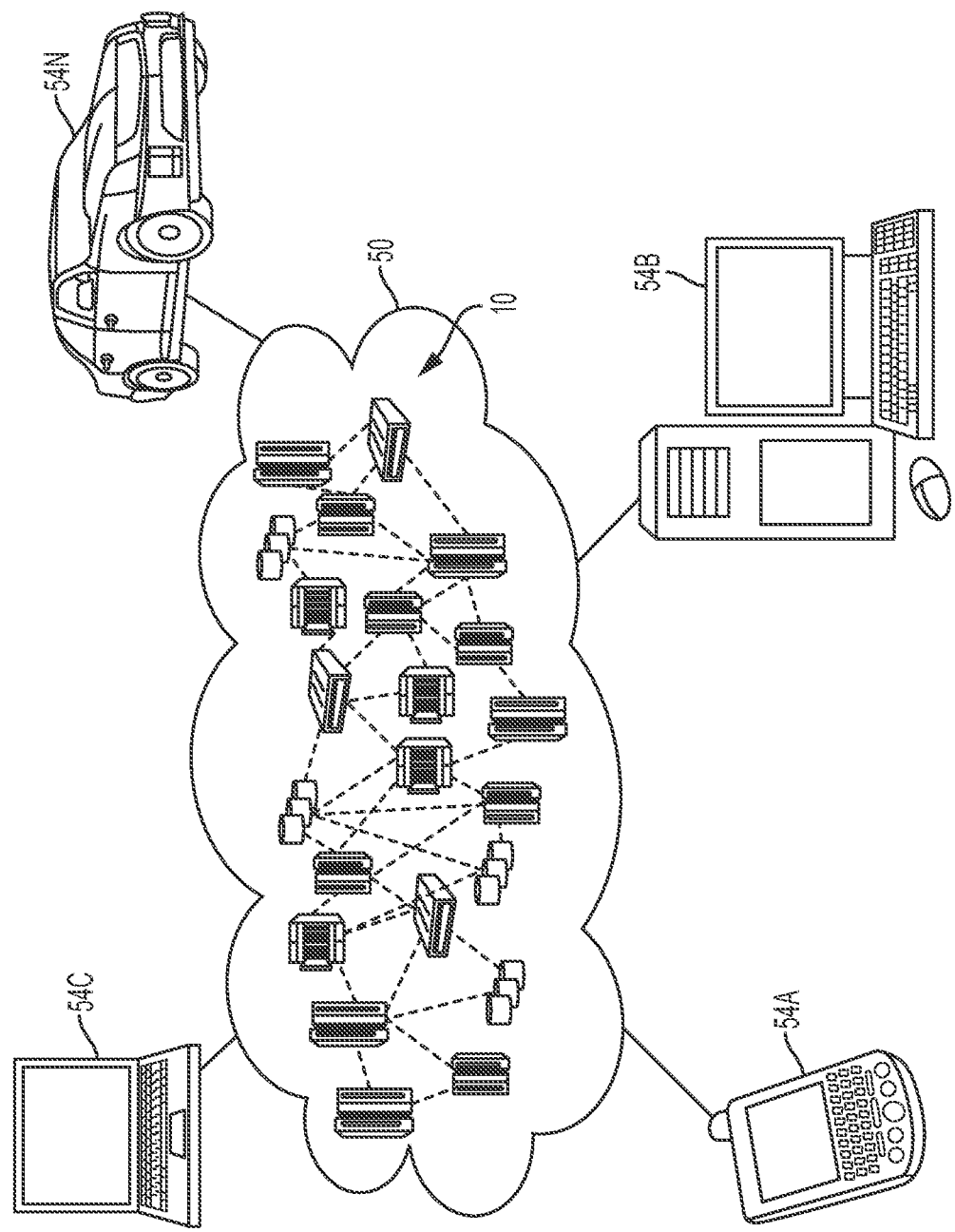
FIG. 11 depicts a cloud computing environment according to an embodiment of the present invention.

FIG. 11 depicts a cloud computing environment according to an embodiment of the present invention. Referring now to FIG. 11, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another and may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
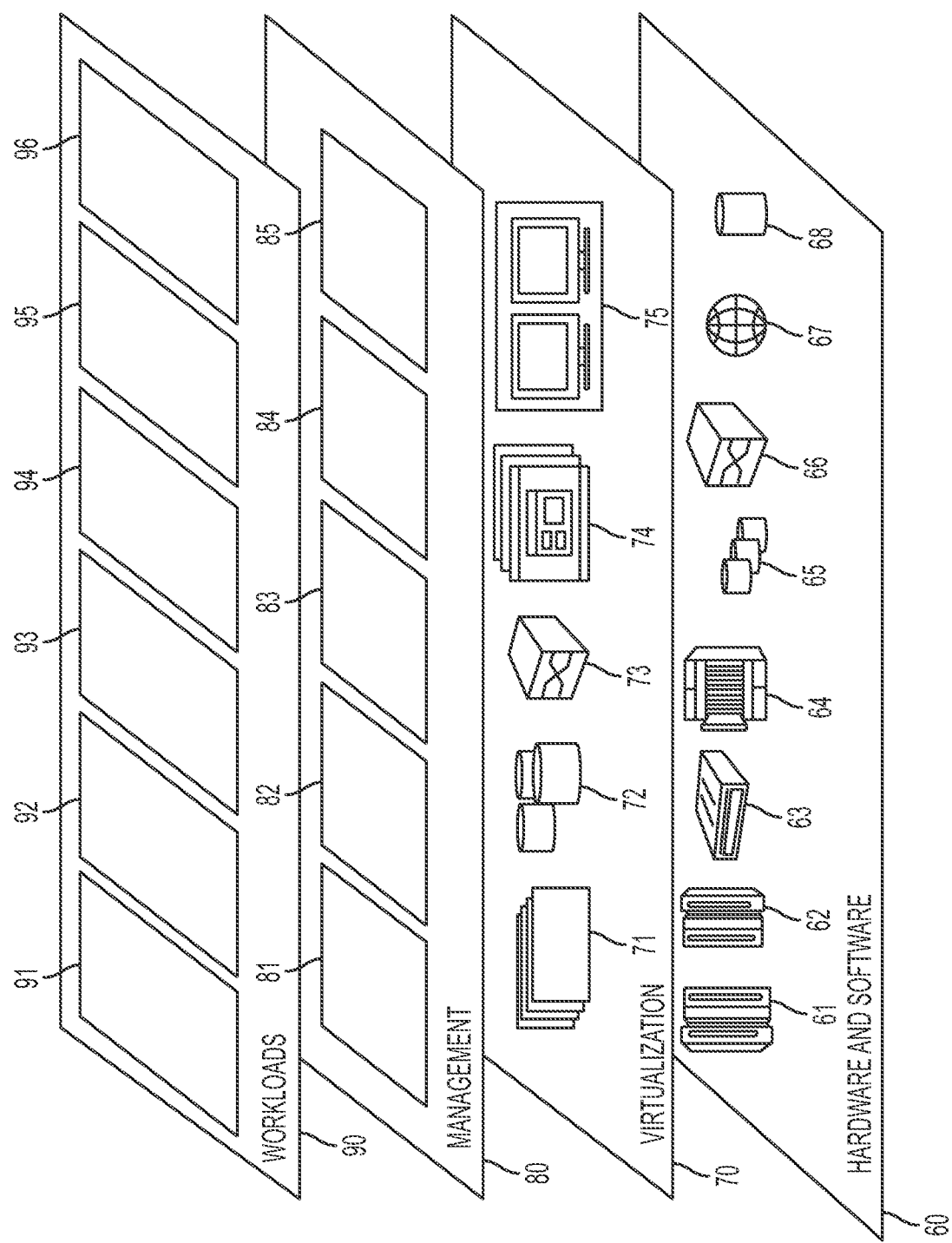
FIG. 12 depicts abstraction model layers according to an embodiment of the present invention.

FIG. 12 depicts abstraction model layers according to an embodiment of the present invention. Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system 96 to receive data and calculate the EOL factors discussed above according to the present invention.

The disclosure discusses a method to use machine learning techniques to estimate the end of life (EOL) of a multi-vendor system. The invention identifies several methods to estimate the Risk score at the asset level and also at the ecosystem level The invention discusses a machine learning techniques using multivariate regression and neural networks to estimate the risk score.

The invention discusses a method for computing a risk score at an asset level and at an ecosystem level. This invention can be used within an enterprise, in datacenters, and across hybrid clouds. The invention provides the ability to compute the end of life of an ecosystem.

First, the invention sources historical data of hardware and software and analyzes the data to give usage pattern, criticality, etc. This is partial generic step, with additional modeling framework because currently no known solutions provide analytics and the closed-form relations that may be effectively employed.

Using a modeling framework, the invention extracts input parameters from sub-system such as keyboard, server/system, battery, monitor. These inputs are number of flickers, key-board response time, battery charging rate, charge hold time over time, CPU/memory utilization, temperature, fan status, availability, Latency (ping round trip time), packet loss, frequency of incidents, mean time to repair, KPI threshold deviations, number of anomalies, events/log data, business criticality. Design data, manufacturer, benchmark, target. An input matrix is created from these inputs. A state matrix is created for each of systems mentioned above. Correlation and criticality of input matrix & state matrix is created with outputs of each component, server/system.

The invention further applies PCA to create dominant features and regenerating input and state matrices.

Output from analytic stage is input into a "System Odometer" which provides remaining useful usage and in sync with current interventions, workload, and response time.

Output from the system odometer is provided as input to "Expert System" for computing probability of system survival for next N years, parts to be replaced for system to survive next N years, and estimated life.

Output from the expert system is provided as input to 'Capex/Opex Optimizer' which computes below to give the final output which can be used by a system administrator to take further action.

All of these analytics engines provide final engine utilizing a cognitive and artificial intelligence (AI) based system and provides following: forecast of issues for next X days, trend of resource contention, sequence of processes to avoid contention, maintenance recommendations, and optimal maintenance schedule.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method to manage economics and operational dynamics of various information technology systems, the method comprising:
   evaluating, by a processor, first data indicative of operation of a plurality of hardware components and second data indicative of operation of a plurality of software components to determine dynamic limits of various system conditions indicative of operating performance of the plurality of the hardware and software components;
   applying, by the processor, the various system conditions to a model of analysis to determine a residual useful life value for the plurality of hardware and software components;
   performing, by the processor, an analysis for real-time data related to the plurality of the hardware and software components to determine a number of times a probability of failure has exceeded a predetermined threshold;
   creating, by the processor, a first qualitative value representing a hardware status of the plurality of the hardware components and a second qualitative value representing a software status of the plurality of the software components; and
   computing, by the processor, a probability of life expectancy for the plurality of the hardware components and the plurality of the software components based on the first and second qualitative values.

2. The method of claim 1, further comprising:
   delivering data associated with the performing as a probability density function value to an expert system for computing a probability of failure of at least one of the hardware and software components over a fixed period of time.

3. The method of claim 2, further comprising:
   generating an output in a form of a risk score for the plurality of the hardware and software components.

4. The method of claim 3, wherein the risk score is indicative of an intensity of a failure probability.

5. The method of claim 4, further comprising:
   calculating the risk score based on a formula represented by an individual Asset Risk Score$_{a1}$ equal to $\beta_{0a1} + \beta_{1a1}X_{1a1} + \beta_{2a1}X_{2a1} + \ldots + \beta_{na1}X_{na1}$, where $\beta_{0a1}$, $\beta_{1a1}$ etc. are coefficients determined by regression techniques and $X_{1a1}$, $X_{2a1}$ etc. are variables and a cumulative risk score represented by Cumulative Asset Risk Score=$\theta_0 + \theta_1$ Risk Score$_{a1} + \theta_2$ Risk Score$_{a2} + \ldots + \theta_n$ Risk Score$_{an}$, where $\theta_0$, $\theta_1$ etc. are coefficients determined by regression techniques and Risk Score$_{a1}$, Risk Score$_{a2}$ etc. are individual risk scores for respective assets.

6. The method of claim 1, further comprising:
   collecting the first and second data from first sensors arranged physically on the hardware components and second sensors detecting operation of the software components.

7. The method of claim 1, further comprising:
   applying at least one of: fuzzy logic, and a principal component analysis (PCA) to create dominant features and regenerating input and state matrices, wherein the PCA uses an orthogonal transformation to convert a set of observations of possibly correlated variables into a set of values of linearly uncorrelated variables.

8. The method of claim 1, wherein the probability of life expectancy includes at least one of: a forecast of issues for a next X days, a trend of resource contentions, a sequence of processes to avoid contention, a maintenance recommendation, an optimal maintenance schedule, and an economic optimization.

9. The method of claim 1, wherein the analysis for real-time data related to the plurality of the hardware and software components to determine the number of times the probability of failure has exceeded the predetermined threshold is performed by a system odometer.

10. A computer program product comprising:
    a computer-readable storage medium; and
    a computer-readable program code stored in the computer-readable storage medium, the computer readable program code containing instructions executable by a processor of a computer system to implement a method to manage economics and operational dynamics of various information technology systems, the method comprising:
    evaluating first data indicative of operation of a plurality of hardware components and second data indicative of operation of a plurality of software components to determine dynamic limits of various system conditions indicative of operating performance of the plurality of the hardware and software components;
    applying the various system conditions to a model of analysis to determine a residual useful life value for the plurality of hardware and software components;
    performing an analysis for real-time data related to the plurality of the hardware and software components to determine a number of times a probability of failure has exceeded a predetermined threshold;
    creating a first qualitative value representing a hardware status of the plurality of the hardware components and a second qualitative value representing a software status of the plurality of the software components; and
    computing a probability of life expectancy for the plurality of the hardware components and the plurality of the software components based on the first and second qualitative values.

11. The computer program product of claim 10, further comprising:
    delivering data associated with the performing as a probability density function value to an expert system for computing a probability of failure of at least one of the hardware and software components over a fixed period of time.

12. The computer program product of claim 11, further comprising:
    generating an output in a form of a risk score for the plurality of the hardware and software components.

13. The computer program product of claim 12, wherein the risk score is indicative of an intensity of a failure probability.

14. The computer program product of claim 13, further comprising:
    calculating the risk score based on a formula represented by an individual Asset Risk Score$_{a1}$ equal to $\beta_{0a1} + \beta_{1a1}X_{1a1} + \beta_{2a1}X_{2a1} + \ldots + \beta_{na1}X_{na1}$, where $\beta_{0a1}$, $\beta_{1a1}$ etc. are coefficients determined by regression techniques and $X_{1a1}$, $X_{2a1}$ etc. are variables and a cumulative risk score represented by Cumulative Asset Risk Score=$\theta_0 + \theta_1$ Risk Score$_{a1} + \theta_2$ Risk Score$_{a2} + \ldots + \theta_n$ Risk Score$_{an}$, where $\theta_0$, $\theta_1$ etc. are coefficients determined by regression techniques and Risk Score$_{a1}$, Risk Score$_{a2}$ etc. are individual risk scores for respective assets.

15. The computer program product of claim 10, further comprising:
collecting the first and second data from first sensors arranged physically on the hardware components and second sensors detecting operation of the software components.

16. The computer program product of claim 10, further comprising:
applying at least one of: fuzzy logic, and a principal component analysis (PCA) to create dominant features and regenerating input and state matrices, wherein the PCA uses an orthogonal transformation to convert a set of observations of possibly correlated variables into a set of values of linearly uncorrelated variables.

17. The computer program product of claim 10, wherein the analysis for real-time data related to the plurality of the hardware and software components to determine the number of times the probability of failure has exceeded the predetermined threshold is performed by a system odometer.

18. A computer system, comprising:
a processor;
a memory coupled to said processor; and
a computer readable storage device coupled to the processor, the storage device containing instructions executable by the processor via the memory to implement a method to manage economics and operational dynamics of various information technology systems, the method comprising:
evaluating first data indicative of operation of a plurality of hardware components and second data indicative of operation of a plurality of software components to determine dynamic limits of various system conditions indicative of operating performance of the plurality of the hardware and software components;
applying the various system conditions to a model of analysis to determine a residual useful life value for the plurality of hardware and software components;
performing an analysis for real-time data related to the plurality of the hardware and software components to determine a number of times a probability of failure has exceeded a predetermined threshold;
creating a first qualitative value representing a hardware status of the plurality of the hardware components and a second qualitative value representing a software status of the plurality of the software components; and
computing a probability of life expectancy for the plurality of the hardware components and the plurality of the software components based on the first and second qualitative values.

19. The computer system of claim 18, further comprising:
delivering data associated with the performing as a probability density function value to an expert system for computing a probability of failure of at least one of the hardware and software components over a fixed period of time.

20. The computer system of claim 18, wherein the analysis for real-time data related to the plurality of the hardware and software components to determine the number of times the probability of failure has exceeded the predetermined threshold is performed by a system odometer.

* * * * *